(12) United States Patent
Mitchell

(10) Patent No.: US 7,134,218 B1
(45) Date of Patent: Nov. 14, 2006

(54) ODD OFFSET FABRICATION KIT

(76) Inventor: Irvin Mitchell, 2312 Westgate Pkwy., Gautier, MS (US) 39553

( * ) Notice: Subject to any disclaimer, the term of this patent is extended or adjusted under 35 U.S.C. 154(b) by 13 days.

(21) Appl. No.: 11/115,744

(22) Filed: Apr. 27, 2005

Related U.S. Application Data

(60) Provisional application No. 60/566,623, filed on Apr. 29, 2004.

(51) Int. Cl.
*G01B 5/24* (2006.01)

(52) U.S. Cl. .......................... 33/529; 33/563; 33/1 SB

(58) Field of Classification Search .................. 33/1 B, 33/1 G, 1 N, 1 R, 1 AP, 1 SB, 1 SD, 412, 33/529, 562, 563, 566
See application file for complete search history.

(56) References Cited

U.S. PATENT DOCUMENTS

| | | | |
|---|---|---|---|
| 2,334,422 A * | 11/1943 | Lehnus | 33/529 |
| 2,502,660 A * | 4/1950 | McLean | 33/529 |
| 2,658,672 A * | 11/1953 | Dalzell | 33/1 SD |
| 2,899,750 A * | 8/1959 | Becroft | 33/529 |
| 3,195,233 A * | 7/1965 | Brocklainder | 33/1 G |
| 6,505,412 B1 * | 1/2003 | Hauzie, Jr. | 33/529 |
| 6,854,190 B1 * | 2/2005 | Lohmann | 33/1 SB |
| 6,904,690 B1 * | 6/2005 | Bakke et al. | 33/562 |
| 2002/0088132 A1 * | 7/2002 | Byrnes | 33/529 |
| 2002/0139000 A1 * | 10/2002 | Kneipp | 33/529 |

* cited by examiner

*Primary Examiner*—G. Bradley Bennett
(74) *Attorney, Agent, or Firm*—Garvey, Smith, Nehrbass & North, L.L.C.; Gregory C. Smith

(57) ABSTRACT

A template that would be created with a given line for outside, centerline and inside radius of ell marked in one degree increments, starting with zero degree from the end of each radius of ell and ending at ninety degrees. Incorporated on the template would be a sketch of back to back odd fittings, with all dimensions given for the offset, end to end and the take off of all dimensions from one to ninety degrees, for odd fittings fabricated from the standard ninety degree ell. The offset, and end to end dimensions, would terminate at ninety degrees. Also incorporated on the template would be a sketch of a ninety degree ell with odd degree fitting attached, with all dimensions given for the offset and the center to end using all degrees from one to ninety.

7 Claims, 9 Drawing Sheets

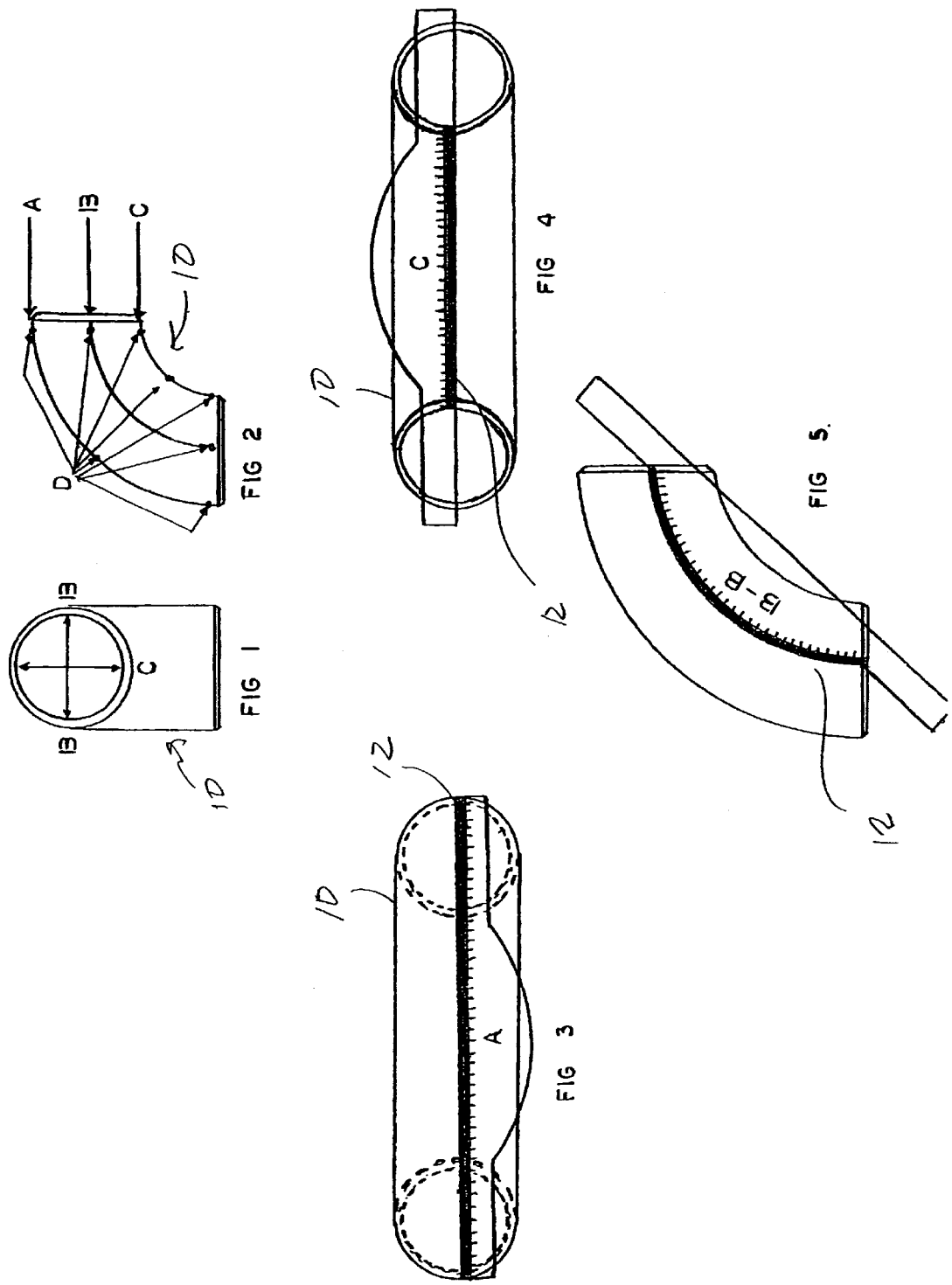

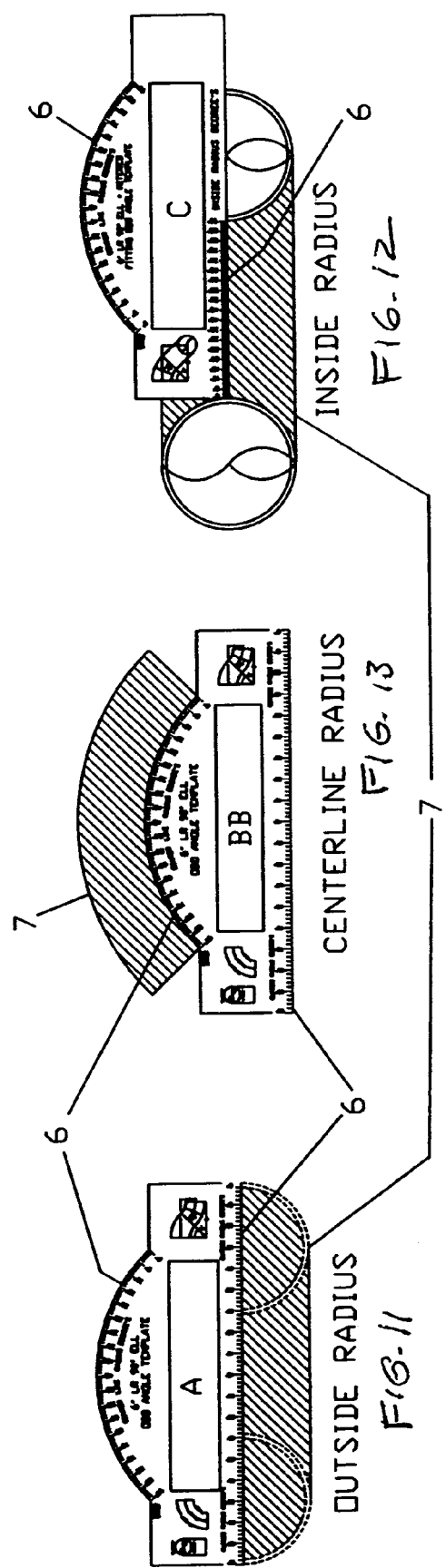
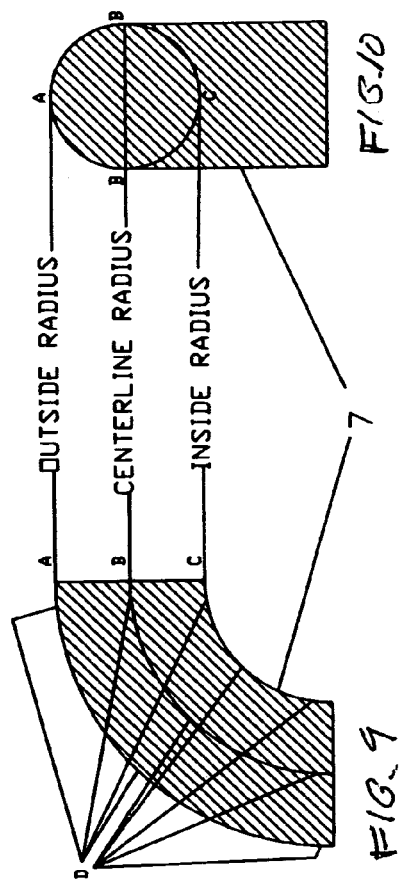

ODD OFFSET FABRICATION KIT

CROSS-REFERENCE TO RELATED APPLICATIONS

Priority of U.S. Provisional Patent Application Ser. No. 60/566,623, filed Apr. 29, 2004, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The summary of the invention relates to a template or pattern for the layout of odd offsets in pipe fabrication using the standard ninety degree long radius ell. More particularly, the template can be developed in a raw material and on a software program with the capability of printing the template with the use of a plotter.

2. General Background of the Invention

For the past nearly three decades the inventor has been involved in the field of pipe fabrication. During this time he has encountered challenges that caused much valuable time searching for solutions to solve problems in the area of odd offsets. It is through these experiences he realized that there is a very low percentage of pipe fabricators capable of rising above these challenges.

BRIEF SUMMARY OF THE INVENTION

The present invention would solve the problems in the art in a simple and straight forward manner. What it provided is a template that would be created with a given line for outside, centerline and inside radius of ell marked in one degree increments, starting with zero degree from the end of each radius of ell and ending at ninety degreews. Incorporated on the template would be a sketch and chart with calculated values for back to back odd fittings, with all dimensions given for the offset, end to end and the take off of all dimensions from one to ninety degrees, for odd fittings fabricated from the standard ninety degree ell. Also incorporated on the template would be a sketch and chart with calculated values for a ninety degree ell with odd degree fitting attached, with all dimensions given for the offset and the center to end dimensions using all degrees from one to ninety.

Therefore, it is a principal object of the present invention to aid pipe instructors, fabricators, designers and engineers with a tool to simplify the method of odd offsets without the use of formulas and calculations.

It is a further object of the present invention to offer answers for solutions, without the calculation of formulas, and to eliminate errors from calculations.

It is a further object of the present invention to simplify the process for use by common craftsman, and eliminating valuable time used for researching solutions.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 illustrates the front view of ell;

FIG. 2 illustrates the side view of ell;

FIG. 3 illustrates a configuration for outside radius layout;

FIG. 4 illustrates a configuration for inside radius layout;

FIG. 5 illustrates a configuration for center line radius layout;

FIG. 9 illustrates a side view of a ninety degree ell in the upright position;

FIG. 10 illustrates a front view thereof;

FIG. 11 illustrates a view of the ell with a template;

FIG. 12 illustrates a view of the ell in a flat position in combination with the template;

FIG. 13 illustrates a top view of the ell in a flat position in combination with the template;

FIGS. 16 and 16A illustrate the calculations in regard to odd degree fittings inside one of the templates.

DETAILED DESCRIPTION OF THE INVENTION

FIGS. 1–8 illustrate the preferred embodiment of the apparatus of the present invention, while FIGS. 9 through 17 illustrate additional embodiments of the present invention.

As seen first in FIG. 1, there is provided the front view of ell 10, having a first outside radius A, a centerline radius B, and an inside radius c. In FIG. 2, the side view of ell 10 is shown, having the outside radius A, the centerline radius B, and the inside radius C, and further illustrating center line punch marks D. The center marks on inside and outside radius lines A and C, as shown in FIG. 2, should have a minimum of three punch marks, for purposes of straight line layout.

Turning now to FIG. 3, there is illustrated the configuration of outside radius layout. After the centerline layout, place degree graph 12 using side A on the centerline of outside radius placing the zero degree increment on each end of ell 10, then mark the desired degree.

As seen in FIG. 4, there is illustrated the configuration for inside radius layout. After the centerline layout, place degree graph 12 using side C on the centerline of inside radius, placing the zero increment on each end of ell 10, then mark the desired degree.

As seen in FIG. 5, there is illustrate the configuration for centerline radius layout. After the centerline layout, place degree graph 12, using side B—B on the centerline of centerline radius, placing the zero degree increment on each end of ell 10, then mark desired degree.

Figure 6:
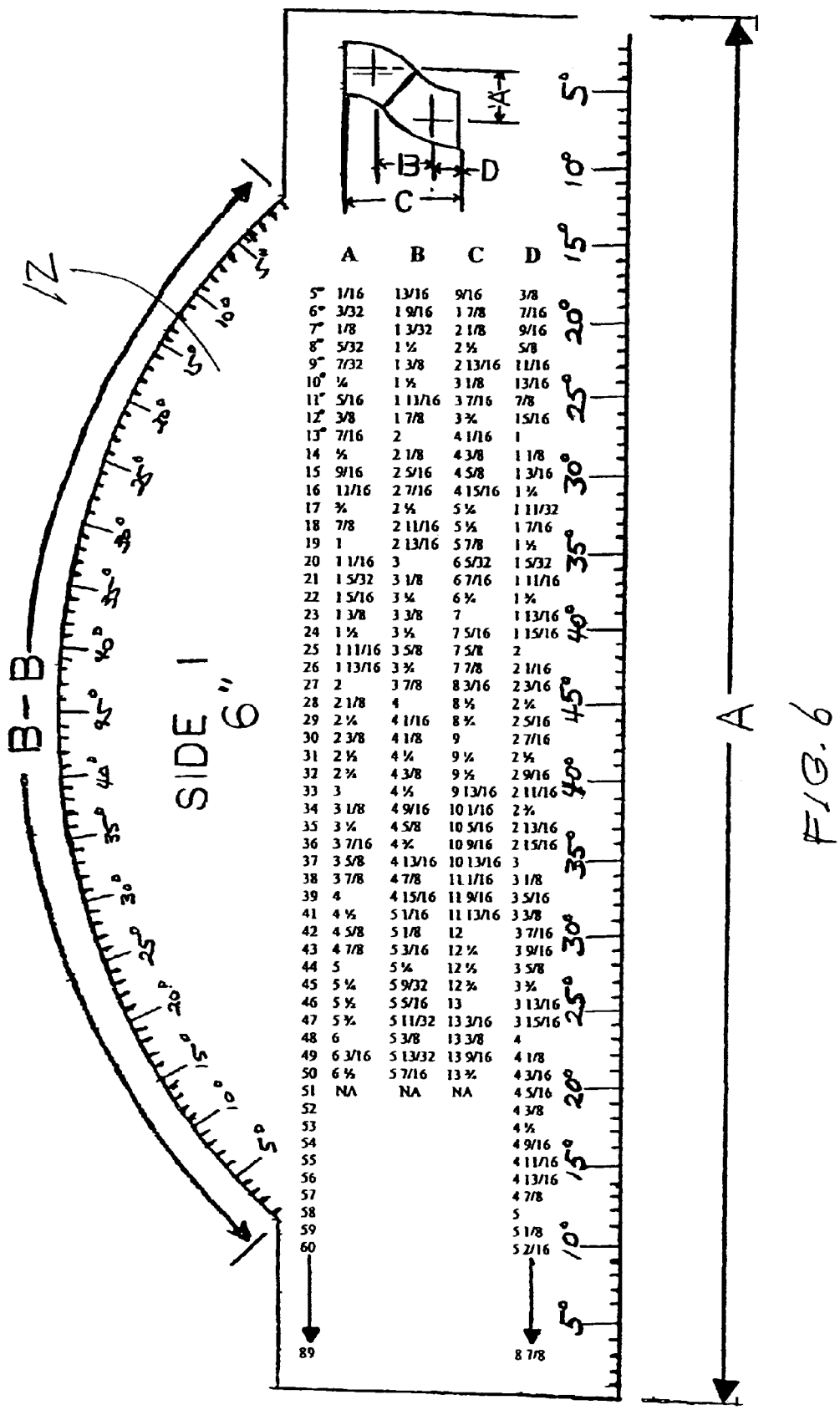
FIG. 6 illustrates a view of side one of the template of the present invention.

Turning now to FIG. 6, in the view of side 1 of the template, the dimension B—B illustrating centerline radius from end to end of ell 10. Dimension A illustrates outside radius from end to end. Also to be incorporated in this view is the pipe fitting size, a sketch of back to back odd degree ells 10 along the dimension given. For the set, see dimension A; for Run, see dimension B; and face to face, see dimension C for odd degree ells for minimum applicable to 50 degrees. Also to be incorporated in this view is the given dimensions for centerline to end, of odd degree ells from applicable to 89 degrees. See dimension D. Also note that all dimensions given are to be fabricated from the long radius standard ell.

Figure 7:
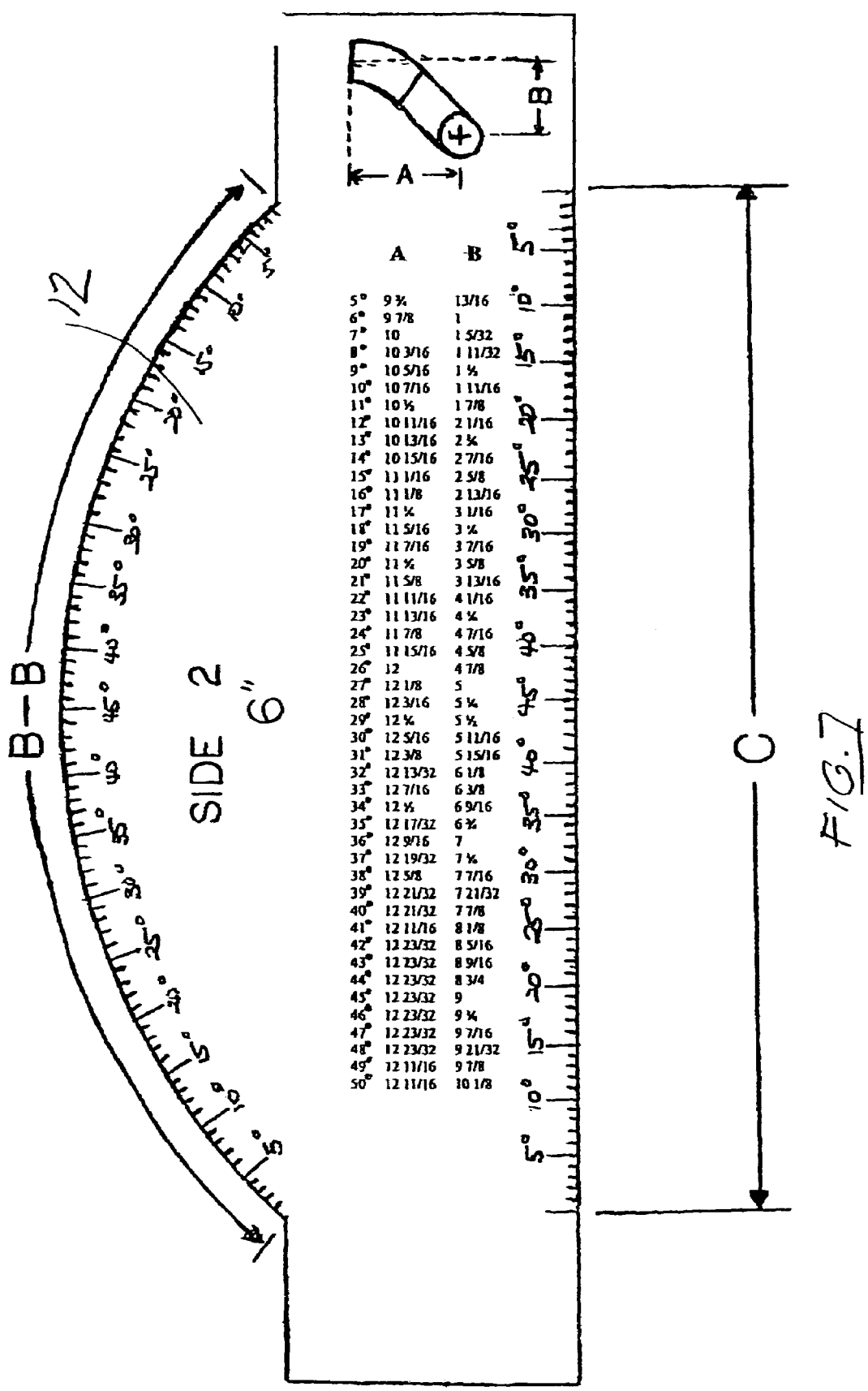
FIG. 7 illustrates a view of side two of the template of the present invention.

Turning now to FIG. 7, there is illustrated side two of the template, B—B dimension illustrates centerline radius from end to end of ell. C dimension illustrates inside radius from end to end of ell 10. Also to be incorporated in this view is a sketch of a standard ninety degree long radius ell with odd degree ell attached, along with dimensions given for centerline to face. See dimension line A and offset; and see dimension B from applicable to fifty degrees.

Figure 8:
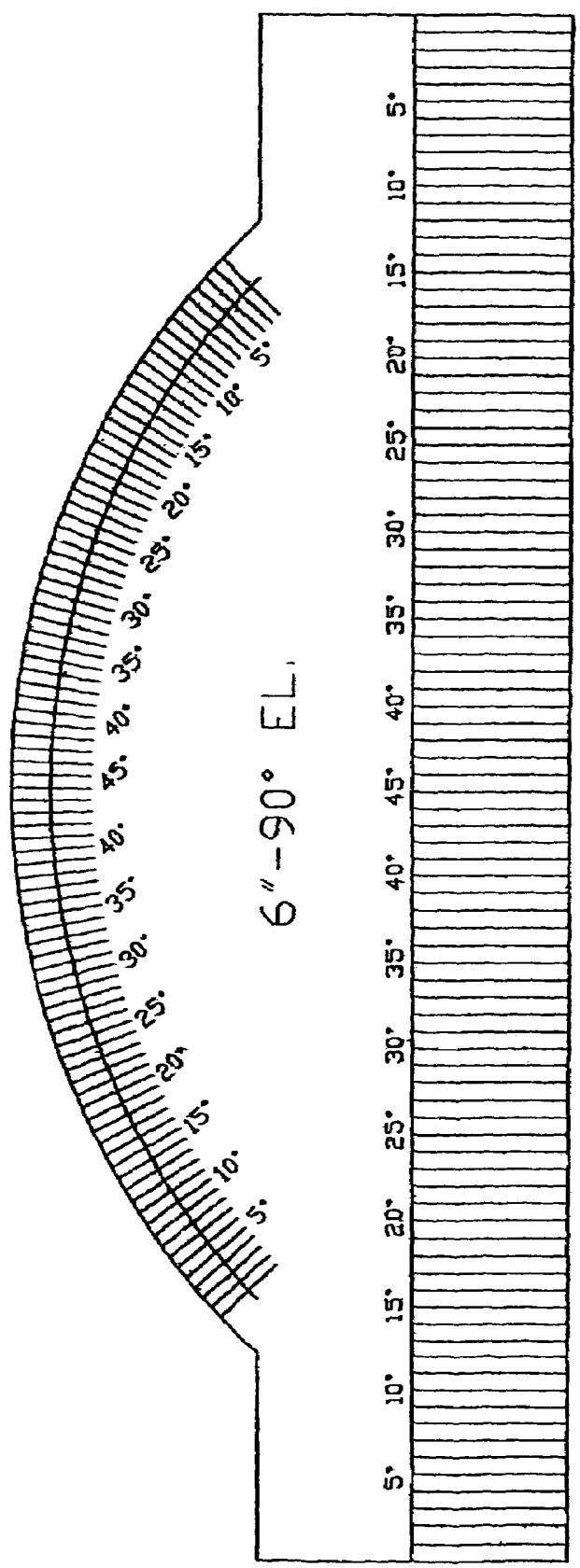
FIG. 8 illustrates a side view of the original concept of the template design.

FIG. 8 illustrates a side view of the original concept of the template design.

Turning now to FIGS. 9 through 17, there is illustrated first in FIGS. 9 and 10 a side view and front view, respectively, of a ninety degree ell 7 in an upright position, wherein Line A makes reference to the outside radius of the ell; wherein Lines B—B makes reference to the center line radius of the ell; and wherein Line C makes reference to the inside radius of the ell, as seen in FIGS. 9 and 10. There is also illustrated Lines D which prvide the recommendation for the center punch marks used for orientation of the template layout for center line accuracy.

Turning now to FIG. 11, there is illustrated a view of the ninety degree ell 7 in the flat position with the orientation used with side 1 of the template for layout of the Figure A on the template.

FIG. 12 illustrates a view of a ninety degree ell 7 in the flat position with the orientation used with side 2 of the template for layout of Figure C on the template. While FIG. 13 illustrates a top view of the ninety degree ell 7 in the flat position with the orientation used with side 1 or side 2 of the template for layout of Figure BB on the template.

As seen in the FIGS. 11 through 13, numeral 6 illustrates one degree increment graph.

Figure 14:
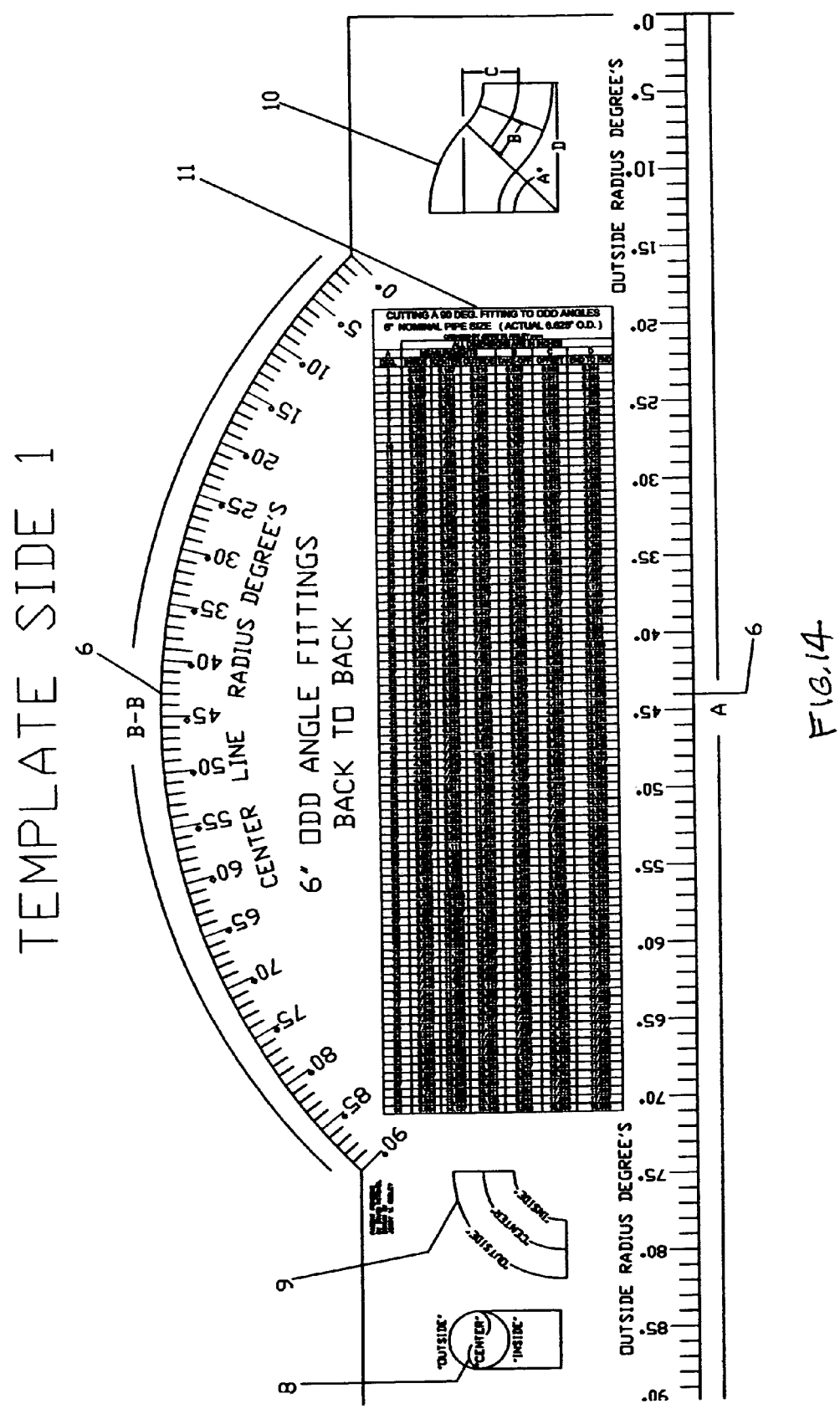
FIG. 14 illustrates side 1 of the template.
Figure 16:
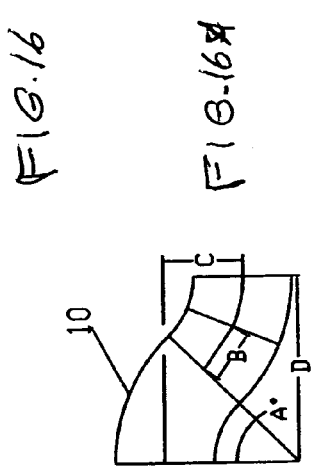

Turning now to FIG. 14, there is illustrated side 1 of the template, wherein numerals 8 and 9 illustrate a sketch incorporated for reference of values given in FIG. 16, which is calculations of odd degree fittings back to back regarding side 1 of the template. The values are illustrated by the numerals 15 and 22 in FIG. 16. Returning to FIG. 14, there is illustrated an item 10 which illustrates a sketch of odd fittings or any back to back for reference of calculated values given in 14, 16, 17 and 18 in FIG. 16. In item 10, "A" would represent the desired odd degree fitting; "B" would represent the center line to end dimension of desired fitting; "C" would represent the offset of the desired attached fittings; and "D" would represent end to end dimension of the attached fittings. Further, reference is made to item 11, which is a chart of calculated values for A, B, C and D of item 10 and actual dimensions for layout of odd fitting in reference to 15 and 22 in FIG. 16.

Figure 15:
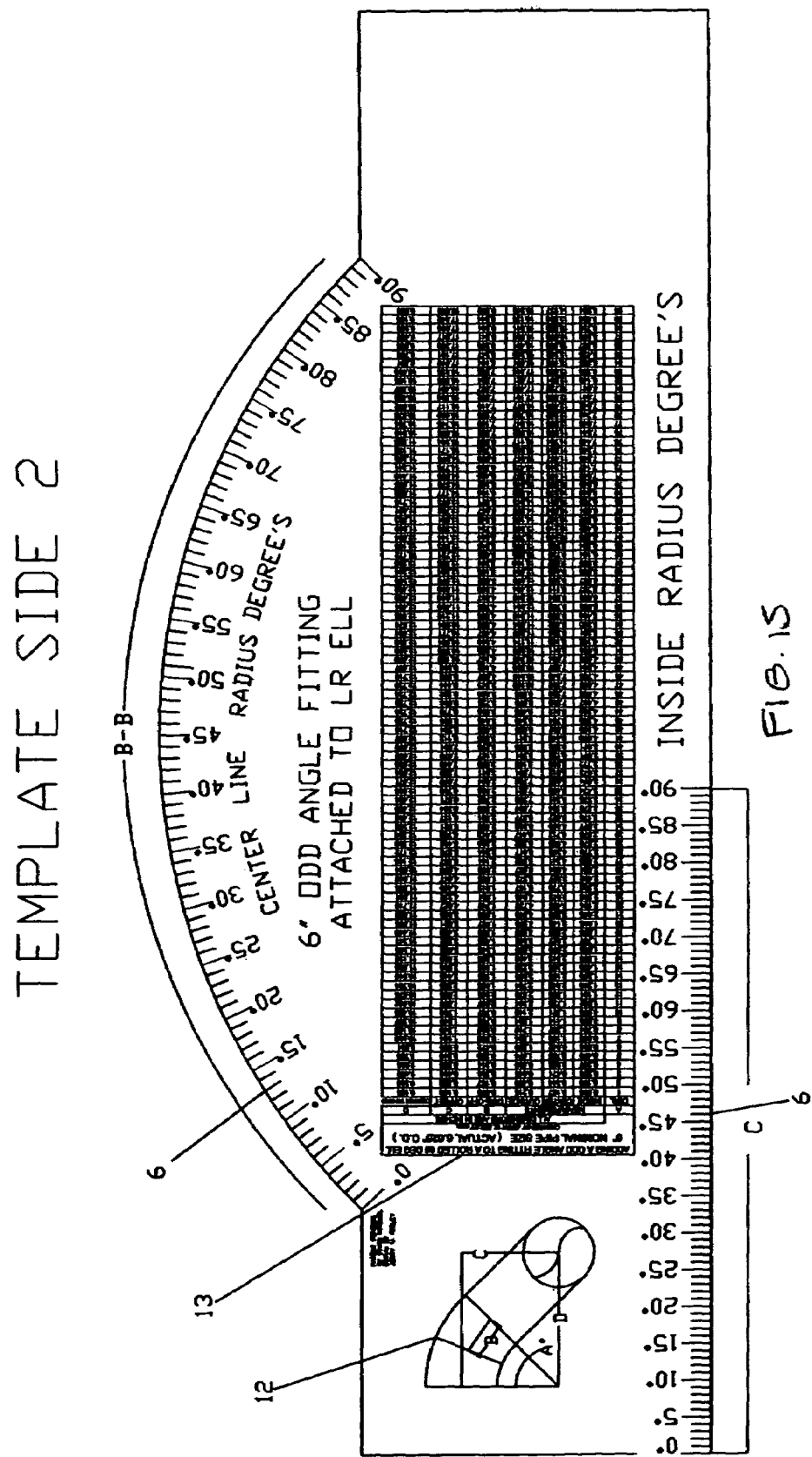
FIG. 15 illustrates side 2 of the template.

Turning now to FIG. 15, this represents the embodiment of side 2 of the template used for ninety degree ell with simple odd fittings attached. In item 12 shown on side 2 of the template in FIG. 15, there is illustrated a sketch incorporated for reference values given in 19, 20, 21 and 23 in FIG. 17, which is the calculations of an odd degree fitting attached to a ninety degree ell as it relates to side 2 of the template. In FIG. 15 there is further illustrated item 13, which is a calculation chart of an odd fitting attached to a ninety degree ell in references to A, B, C and D of item 12 in FIG. 15.

Turning now to FIG. 16, there is illustrated, as was referenced earlier, calculations of odd degree fittings back to back in regard to side 1 of the template. Further is seen column 14 (also labeled column A) which illustrates the degree of the odd fitting. In this orientation, two fittings back to back will be required to obtain given dimensions in column 17 (also labeled column C), for offset and in column 18, (also labeled column D) for end to end. One can refer to figures C and D of item 10, which is illustrated in FIG. 16A. In column 15, there is illustrated the actual dimensions used for the layout of the outside center line and inside radius of ninety degree ell 7 to obtain the desired single odd degree fitting listed in column 14 (also labeled column A). These were the values incorporated into the one degree increment graphs 6 as illustrated in FIGS. 11 through 13. These measurements were incorporated into the design for verification purposes only.

Reference is now made to column 16 (also labeled column B) on FIG. 16, which illustrates the actual dimensions of center line to end of the desired object refitting listed in column 14 (also labeled column A). One can refer to item B of number 10 in FIG. 16A.

Turning now to column 17 (also labeled column C), this illustrates the offset dimensions of two attached odd fittings listed in column 14 (also labeled column A) and one can refer to C of item 10 in FIG. 16A.

Turning now to column 18 (also labeled column D), this illustrates the end to end dimensions of two attached odd fittings listed in column 14 (also labeled column A). These refer to D of item 10 of FIG. 16A.

As an example, if the known offset is 2", then the decimal 1.962" listed in column 17 (also labeled column C) in FIG. 16 would be the desired value to obtain the odd fittings to be used listed on the same row in column 14 (also labeled column A) in FIG. 16. These would be two twenty-seven degree fittings back to back. Also listed in the same row would be the calculated value for end to end listed in column 18 (also labeled column D), dimension 8.172", and calculated values for the (takeoff) center to end listed in column 16 (also labeled column B) with dimension 2.161" as seen in FIG. 16.

Figure 17:
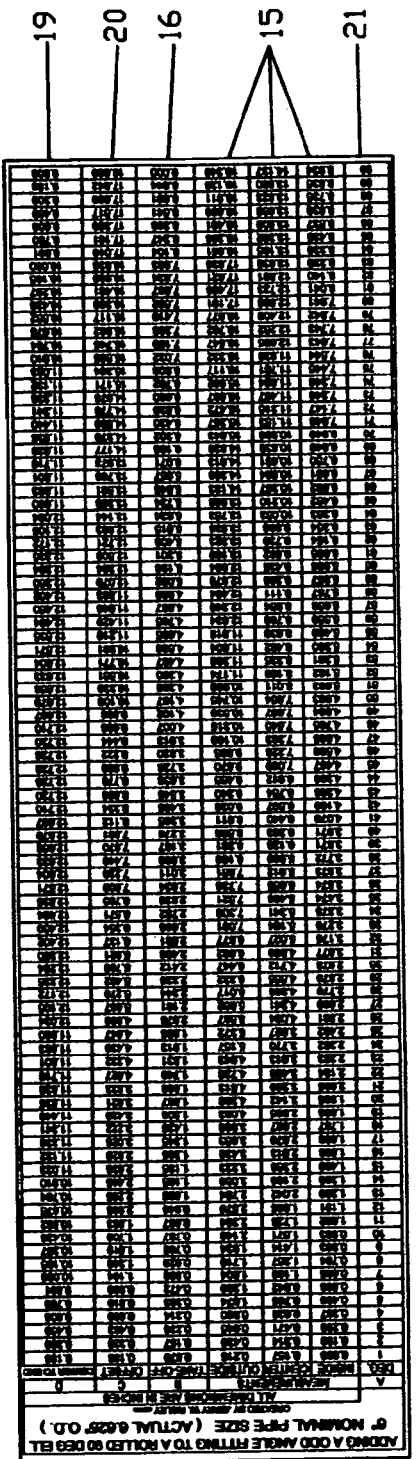
FIGS. 17 and 17A illustrate calculations of odd degree fittings on side 2 of the template.
Figure 17A:
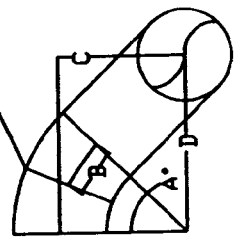

Turning finally to FIGS. 17 and 17A, FIG. 17 illustrates side 2 of the template and the calculations of an offset degree fitting attached to a ninety degree ell. There is illustrated column 19 (also labeled column D), which illustrates the center to end dimension of a single odd fitting listed in column 14 (also labeled column A) attached to a ninety degree ell. One can refer to D of item 12 in FIG. 17A.

Turning now to column 20 (also labeled column C), there is illustrated the offset dimension of a single odd fitting listed in column 14 (also labeled column A) attached to a ninety degree ell. One can refer to C in item 12 in FIG. 17A. Finally, column 21 (also labeled column A) in FIG. 17, illustrates the degree of odd fitting. Note in this orientation a single odd fitting attached to a ninety degree ell will be required to obtain given dimensions in column 19 (also labeled Column B) for center to end and column 20 (also labeled Column C) for offset. One can refer to C and D of item 12 in FIG. 17A.

The foregoing embodiments are presented by way of example only; the scope of the present invention is to be limited only by the following claims.

The invention claimed is:
1. An odd offset fabrication kit, comprising:
   a. a template with a given line for outside, centerline and inside radius of ell marked in one degree increments;
   b. a sketch of back to back odd fittings, with all dimensions given for the offset, end to end and center to end dimensions for odd fittings fabricated from the standard 90 degree ell; and
   c. a sketch of a 90 degree ell with odd degree fitting, with all dimensions given for the offset and the center to end.
2. The template in claim 1, wherein the dimensions given would be from one to ninety degrees.
3. The template in claim 1, wherein the set, run and center to end dimensions would terminate at ninety degrees.
4. A template, comprising a given line for outside, centerline and inside radius of ell marked in one degree increments, starting with zero degree from the end of each radius of ell and ending at ninety degrees, the template further comprising a sketch of back to back odd fittings, with all dimensions given for the offset, end to end and the take off of all dimensions from applicable to ninety degrees, for odd fittings fabricated from the standard ninety degree ell.
5. The template in claim 4, wherein the offset and center to end dimensions, would terminate at ninety degrees.
6. The template in claim 4, further comprising be a sketch of a ninety degree ell with odd degree fitting attached, with all dimensions given for the offset and the center to end using all degrees from applicable to ninety.
7. The template in claim 4, designed for the layout of odd offsets in pipe fabrication using the standard ninety degree long radius ell for each standard pipe size.

* * * * *